United States Patent
Wright et al.

(10) Patent No.: US 12,469,026 B2
(45) Date of Patent: Nov. 11, 2025

(54) METHODS AND DEVICES FOR REGISTERING AND AUTHENTICATING MINER IDENTITY IN A BLOCKCHAIN NETWORK

(71) Applicant: nChain Licensing AG, Zug (CH)

(72) Inventors: Craig Steven Wright, London (GB); Alexander MacKay, London (GB); Wei Zhang, London (GB); Andrew James Mee, London (GB); Steven Patrick Coughlan, London (GB)

(73) Assignee: nChain Licensing AG, Zug (CH)

(*) Notice: Subject to any disclaimer, the term of this patent is extended or adjusted under 35 U.S.C. 154(b) by 196 days.

(21) Appl. No.: 17/609,661

(22) PCT Filed: May 5, 2020

(86) PCT No.: PCT/IB2020/054261
§ 371 (c)(1),
(2) Date: Nov. 8, 2021

(87) PCT Pub. No.: WO2020/229949
PCT Pub. Date: Nov. 19, 2020

(65) Prior Publication Data
US 2022/0092592 A1    Mar. 24, 2022

(30) Foreign Application Priority Data
May 10, 2019    (GB) .................................... 1906645

(51) Int. Cl.
*G06Q 20/38*    (2012.01)
*G06Q 20/06*    (2012.01)
*G06Q 20/40*    (2012.01)

(52) U.S. Cl.
CPC ..... *G06Q 20/38215* (2013.01); *G06Q 20/065* (2013.01); *G06Q 20/3829* (2013.01); *G06Q 20/4014* (2013.01)

(58) Field of Classification Search
None
See application file for complete search history.

(56) References Cited

U.S. PATENT DOCUMENTS 9,635,000 B1 *   4/2017   Muftic .................. H04L 9/3239
9,892,460 B1 *   2/2018   Winklevoss ........... G06Q 40/04
(Continued)

FOREIGN PATENT DOCUMENTS

CN    104915249 A    *    9/2015
CN    109064124 A         12/2018
(Continued)

OTHER PUBLICATIONS

S. Medury, A. Skjellum, R. R. Brooks and L. Yu, "SCRaaPS: X.509 Certificate Revocation Using the Blockchain-based Scrybe Secure Provenance System," 2018 13th International Conference on Malicious and Unwanted Software (Malware), Nantucket, MA, USA, pp. 145-152, doi: 10.1109/MALWARE.2018.8659364. (Year: 2018).*
(Continued)

*Primary Examiner* — Eduardo Castilho
(74) *Attorney, Agent, or Firm* — Messner Reeves LLP

(57) ABSTRACT

Methods and systems for registering identity of a mining node on a blockchain in a blockchain network. The methods may include creating a validity-check transaction having a first output controlled by the mining node and containing a miner identifier and propagating the validity-check transaction on the blockchain network. The methods may further include mining, by the mining node, a new block containing a generation transaction, wherein the generation transaction includes an information field that contains the miner iden-
(Continued)

tifier and a reference to the validity-check transaction. Another node may validate identity by receiving the miner identifier and the reference to the validity-check transaction, retrieving the validity-check transaction to confirm it contains the miner identifier, and determining that the first output is an unspent transaction output.

20 Claims, 8 Drawing Sheets

(56) References Cited

U.S. PATENT DOCUMENTS

| | | | |
|---|---|---|---|
| 10,230,530 | B2 | 3/2019 | Lancashire et al. |
| 10,581,591 | B1* | 3/2020 | Branton ............... H04L 9/3239 |
| 10,839,378 | B1 | 11/2020 | Srinivasan et al. |
| 11,177,937 | B1* | 11/2021 | McCown ............ G06F 21/6254 |
| 11,290,280 | B1* | 3/2022 | Nelson ................. H04L 9/3239 |
| 11,831,748 | B1* | 11/2023 | Fisher ...................... H04L 9/50 |
| 2015/0294308 | A1* | 10/2015 | Pauker .................. G06Q 20/02 705/67 |
| 2016/0080156 | A1 | 3/2016 | Kaliski, Jr. |
| 2016/0292672 | A1 | 10/2016 | Fay et al. |
| 2017/0075941 | A1* | 3/2017 | Finlow-Bates ....... H04L 67/104 |
| 2017/0330180 | A1* | 11/2017 | Song .................... G06Q 20/401 |
| 2018/0109541 | A1* | 4/2018 | Gleichauf ............. H04W 12/06 |
| 2018/0285996 | A1 | 10/2018 | Ma |
| 2018/0287800 | A1 | 10/2018 | Chapman et al. |
| 2018/0336552 | A1* | 11/2018 | Bohli .................. G06Q 20/065 |
| 2018/0337769 | A1* | 11/2018 | Gleichauf .......... G06Q 20/0655 |
| 2019/0044734 | A1* | 2/2019 | Lancashire .......... G06Q 20/223 |
| 2019/0108498 | A1* | 4/2019 | Deshpande .......... G06Q 20/065 |
| 2019/0163672 | A1* | 5/2019 | Shmueli ............... G06Q 20/223 |
| 2019/0164153 | A1* | 5/2019 | Agrawal .............. G06Q 20/065 |
| 2019/0238340 | A1* | 8/2019 | Wang .................. G06F 16/1824 |
| 2019/0268142 | A1* | 8/2019 | Leker .................... H04L 9/3218 |
| 2019/0295049 | A1* | 9/2019 | Karame .............. G06Q 20/3678 |
| 2019/0306190 | A1 | 10/2019 | Suraparaju |
| 2019/0324995 | A1* | 10/2019 | Jakobsson ................. H04L 9/50 |
| 2019/0394026 | A1 | 12/2019 | Bookman et al. |
| 2020/0076603 | A1* | 3/2020 | Li ............................ G06F 16/27 |
| 2020/0082361 | A1* | 3/2020 | Chan .................... G06Q 20/065 |
| 2020/0097953 | A1 | 3/2020 | Islam et al. |
| 2020/0234293 | A1* | 7/2020 | Lee ..................... G06Q 20/3827 |
| 2020/0279332 | A1* | 9/2020 | Xu ......................... G06Q 40/04 |
| 2020/0320056 | A1* | 10/2020 | Manningham ....... G06F 16/9024 |
| 2020/0349554 | A1* | 11/2020 | Simecka ............. G06Q 20/3672 |
| 2021/0021424 | A1* | 1/2021 | Punal .................. G06F 11/3006 |
| 2022/0200975 | A1* | 6/2022 | Madisetti ........... G06Q 20/3829 |

FOREIGN PATENT DOCUMENTS

| | | | |
|---|---|---|---|
| JP | 6340107 | B1 | 6/2018 |
| KR | 101903620 | B1 | 10/2018 |
| WO | 2017136956 | A1 | 8/2017 |
| WO | 2018165940 | A1 | 9/2018 |
| WO | 2019021105 | A1 | 1/2019 |
| WO | 2019021107 | A1 | 1/2019 |
| WO | WO-2019040119 | A1 * | 2/2019 |
| WO | 2019197926 | A1 | 10/2019 |
| WO | WO-2020107919 | A1 * | 6/2020 ........... G06Q 20/102 |
| WO | WO-2020120933 | A1 * | 6/2020 ......... G06F 16/2379 |

OTHER PUBLICATIONS

Sanchez et al. "Proof-of-Proof: A decentralized, trustless, transparent and scalable means of inheriting Proof-of Work Security," Veriblock, 2018, retrieved from https://veriblock.org/wp-content/uploads/2018/03/PoP-WhitePaper.pdf (Year: 2018).*

H. Gulati and C.-T. Huang, "Self-Sovereign Dynamic Digital Identities based on Blockchain Technology," 2019 SoutheastCon, Huntsville, AL, USA, 2019, pp. 1-6, doi: 10.1109/SoutheastCon42311. 2019.9020518. (Year: 2019).*

K. C. Toth and A. Anderson-Priddy, "Self-Sovereign Digital Identity: A Paradigm Shift for Identity," in IEEE Security & Privacy, vol. 17, No. 3, pp. 17-27, May-Jun. 2019, doi: 10.1109/MSEC.2018. 2888782. (Year: 2019).*

J. Yu, D. Kozhaya, J. Decouchant and P. Esteves-Verissimo, "RepuCoin: Your Reputation Is Your Power," in IEEE Transactions on Computers, vol. 68, No. 8, pp. 1225-1237, 2019, doi: 10.1109/TC.2019. 2900648; Date of Publication: Feb. 20, 2019 (Year: 2019 ).*

Chen et al, "Distributed network and ecosystem based on innovative proof-of-reputation consensus protocol," Machine translation of WO2020107919A1, 2018, priority from Application No. CN201811416359.1A Filing date: Nov. 26, 2018 (Year: 2018).*

Stacks-Network, "SIP-001 Burn election.md," retrieved from Github: https://github.com/stacks-network/stacks-core/blob/f22836efbfeee13762811f411dae306ba1d9810e/sip/sip-001-burn-election.md, 2019, commited on Jan. 18, 2019. (Year: 2019).*

Stewart, "Proof of burn—a potential alternative to proof of work and proof of stake,", 2014, retrieved from https://web.archive.org/web/20160131224610/https://bitcointalk.org/index.php?topic=131139.0 (Year: 2014).*

Bitcoin.it, "Proof of burn," retrieved from the Wayback Machine—https://web.archive.org/web/20190501121851/https://en.bitcoin.it/wiki/Proof_of_burn on May 1, 2019, 2019, (Year: 2019).*

Antonopolous, "Mastering Bitcoin," 2nd Edition, 2017, O'Reilly Media, Inc. (Year: 2017).*

Xue et al., "Proof of Contribution: A Modification of Proof of Work to Increase Mining Efficiency," 2018 IEEE 42nd Annual Computer Software and Applications Conference (COMPSAC), Tokyo, Japan, 2018, pp. 636-644, doi: 10.1109/COMPSAC.2018.00096. (Year : 2018).*

B. B. F. Pontiveros, R. Norvill and R. State, "Monitoring the transaction selection policy of Bitcoin mining pools," NOMS 2018—2018 IEEE/IFIP Network Operations and Management Symposium, Taipei, Taiwan, 2018, pp. 1-6, doi: 10.1109/NOMS.2018.8406328. (Year: 2018).*

Luu et al., "Smartpool: Practical Decentralized Pooled Mining," In Proceedings of the 26th USENIX Conference on Security Symposium (SEC'17). Usenix Association, USA, 1409-1426, 2017, (Year: 2017).*

Zamyatin, Alexei et al., "Merged Mining: Analysis of Effects and Implications," 2017, TU Wien, retrieved from https://sec.cs.univie.ac.at/fileadmin/user_upload/i_sec/docs/teaching/thesis/azamyatin_merged_mining.pdf (Year: 2017).*

W. Wang et al., "A Survey on Consensus Mechanisms and Mining Strategy Management in Blockchain Networks," in IEEE Access, vol. 7, pp. 22328-22370, 2019, doi: 10.1109/ACCESS.2019. 2896108 (Year: 2019).*

C. Tang, L. Wu, G. Wen and Z. Zheng, "Incentivizing Honest Mining in Blockchain Networks: A Reputation Approach," in IEEE Transactions on Circuits and Systems II: Express Briefs, vol. 67, No. 1, pp. 117-121, Jan. 2020, doi: 10.1109/TCSII.2019.2901746. (Year: 2020).*

Sachin S. Shetty; Charles A. Kamhoua; Laurent L. Njilla, "Preventing Digital Currency Miners from Launching Attacks Against Mining Pools Using a Reputation-based Paradigm," in Blockchain for Distributed Systems Security , IEEE, 2019, pp. 233-252, doi: 10.1002/9781119519621.ch11 (Year: 2019).*

R. Recabarren and B. Carbunar, 'Hardening Stratum, the Bitcoin Pool Mining Protocol', arXiv [cs.CR]. 2017. (Year: 2017).*

Intellectual Property Office, Combined Search and Examination Report for Application No. GB1906645.5, Nov. 13, 2019, 6 pages, United Kingdom.

Andreas M. Antonopoulos, Mastering Bitcoin Unlocking Digital Crypto-Currencies, Mastering Bitcoin, Dec. 1, 2014, pp. 1-282, O'Reilly Media Inc, Sebastopol, USA.

Greg Walker, Coinbase Transaction, Mar. 10, 2017, 5 pages, https://learnmeabitcoin.com/guide/coinbase-transaction.

Op_Return, Op_Return—Bitcoin Wiki, Sep. 20, 2018, 1 page, https://en.bitcoin.it/w/index.php?title=OP_RETURN&oldid=65736.

International Searching Authority, International Search Report and Written Opinion for PCT/IB2020/054261, Jun. 19, 2020, 17 pages.

(56) References Cited

OTHER PUBLICATIONS

Intellectual Property Office, Combined Search and Examination Report for Application No. GB1906634.9, Oct. 30, 2019, 5 pages, United Kingdom.
International Searching Authority, International Search Report and Written Opinion for PCT/IB2020/054262, Jun. 19, 2020, 14 pages.
Richard Dennis et al., A Temporal Blockchain: A Formal Analysis, 2016 International Conference on Collaboration Technologies and Systems, Oct. 31, 2016, pp. 430-437, IEEE.
Antonopoulos A. M., "Mastering Bitcoin," Jul. 21, 2017, 405 pages, XP055570487, ISBN:378-1-4919-5438-6 Retrieved from the Internet: URL: https://www.oreilly.com/library/view/mastering-bitcoin-2nd/9781491954379/.
Cristina P-S., et al., "Double-spending prevention for Bitcoin zero-confirmation transactions," International Journal of Information Security (IJIS), Springer, Nov. 24, 2014, vol. 18, No. 4, pp. 451-463.
International Search Report and Written Opinion for International Application No. PCT/EP2021/058933 dated Jul. 30, 2021, 13 pages.
Higashikado Y., et al., "A Study on Certificate Management in Consortium Chain," In 2017 Symposium on Cryptography and Information Security, the Institute of Electronics, Information and Communication Engineers, Japan, Jan. 24, 2017, pp. 1-4.
Sako K., et al., "Aspects on Designs to Implement Blockchain Technology in Real World," the IEICE Transactions on Information and Systems B Japanese Edition), the Institute of Electronics, Information and Communication Engineers, Nov. 1, 2017, vol. J100-B, No. 11, 12 Pages.
Teranode Jules, "GitHub—bitcoin-sv-specs/brfc-merchantapi: Merchant API Specification," Mar. 27, 2020, XP093297593, 15 pages, Retrieved from the Internet: URL: https://github.com/bitcoin-sv-specs/brfc-merchantapi.
Torusjkl., et al., "BUIP088: Double spend proof creation and Forwarding," Mar. 29, 2018, XP093297592, 2 pages, Internet Retrieved from the Internet: URL: https://www.bitcoinunlimited.info/voting/raw/raw_file/b38ae3379f71f63bf8df57a0e970cab0baea5e77ecc4702f6f4087b466e2bc11.

* cited by examiner

METHODS AND DEVICES FOR REGISTERING AND AUTHENTICATING MINER IDENTITY IN A BLOCKCHAIN NETWORK

CROSS REFERENCE TO RELATED APPLICATIONS

This application is a U.S. National Stage of PCT Application No. PCT/IB2020/054261 filed on May 5, 2020, which claims the benefit of United Kingdom Application No. 1906645.5, filed on May 10, 2019, the entire contents of which are incorporated herein by reference.

TECHNICAL FIELD

The present disclosure relates to blockchain networks and, in particular, to the registration and authentication of miner identity in a blockchain network.

BACKGROUND

Mining nodes (or "miners") are key elements of a blockchain network. In "proof-of-work" blockchain networks, the mining nodes compete to complete a proof-of-work in order to "win" the race to mine a block and thereby collect the transaction fees and any newly-minted tokens reflected in a coinbase transaction within the new block. In this manner, the miners secure the network, ensuring that transactions are valid and that all participating nodes conform to the prevailing blockchain protocol. However, as most blockchains operate as permissionless protocols, any node may join or leave the network and any node is able to participate as a mining node without securing advance approval from any other node. As blockchains grow in usage and in volume of transactions, properly registering and validating the identity of a mining node (or pool of mining nodes) may also grow in importance.

For example, when it comes to changing the blockchain protocol, arbitrary or "top-down" code changes undermine confidence in the stability and certainty of the system and can open the blockchain network to attacks or possible fraud or theft. As a consensus-based system, any changes to the underlying code for the blockchain network need to be agreed upon by entities that make up the system. In practice, this means that mining nodes must agree to changes since they are the entities that validate transactions, assemble candidate blocks, and carry out the costly work of mining new blocks. It may be advantageous to be able to track and verify the identity of a mining node (or mining pool).

One mechanism for registering and verifying identity in a computer network is through use of a public-key encryption infrastructure. The public key of a key pair may represent a node identifier. In such as system, a node obtains a public-private key pair and then requests registration of its public key with a third-party certificate authority. The certificate authority preforms some level of online or offline authentication of the node and issues a digital certificate for the public key, verifying that the public key is associated with the node. The digital certificate may be signed by the certificate authority. A different node that wishes to verify the identity of the node relies upon its trust in the certificate authority to underpin the certification of the node's identity represented by the digital certificate.

A principal aim of many blockchain system is to provide for electronic transfers and communications that are not reliant upon trust in a third party intermediary. Accordingly, it would be advantageous to provide for a system that does not rely on a certificate authority to validate a node identifier.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLES

Figure 1:
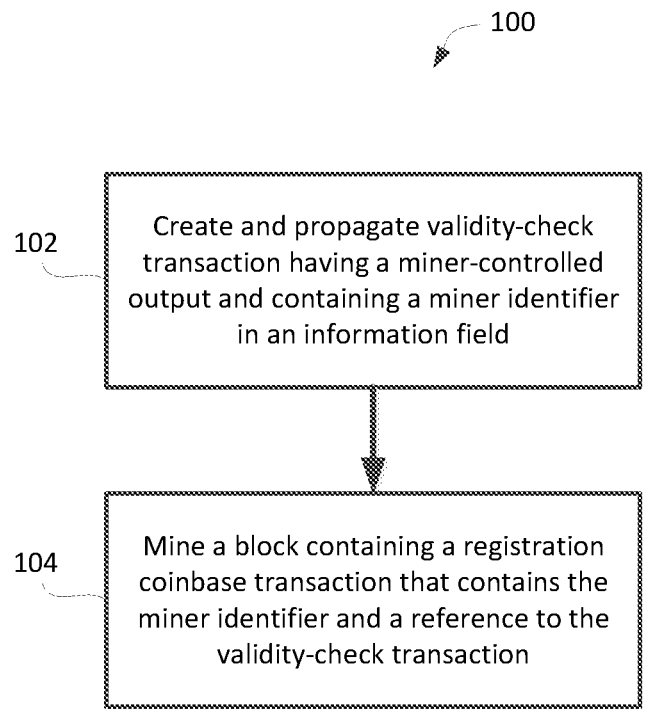
FIG. 1 shows, in flowchart form, one simplified example method of registering a miner identity on a blockchain.

In one aspect, there may be provided a computer-implemented method computer-implemented method of registering identity of a mining node on a blockchain in a blockchain network. The method may include creating a validity-check transaction having a first output controlled by the mining node and containing a miner identifier; propagating the validity-check transaction on the blockchain network; and mining, by the mining node, a new block containing a generation transaction, wherein the generation transaction includes an information field that contains the miner identifier and a reference to the validity-check transaction.

In some implementations, the miner identifier includes a first public key for which the mining node holds a corresponding private key. In some such implementations, the validity-check transaction may include a second output providing an information field, and wherein the first public key is in the information field. The second output may use an OP_RETURN code.

In some implementations, the generation transaction may include an OP_RETURN output providing the information field. In some implementations, the reference to the validity-check transaction includes a transaction identifier.

In some implementations, the information field may further include one or more of an action identifier or a digital signature, wherein the digital signature is generated using a private key corresponding to the miner identifier.

In some implementations, the method may further include verifying, by a second node, the validity of the miner identifier. The verifying may include receiving the miner identifier; retrieving a copy of the generation transaction from the blockchain; retrieving a copy of the validity-check transaction from the blockchain based on the reference contained in the generation transaction; confirming that the received miner identifier matches the miner identifier in the generation transaction and the miner identifier in the validity-check transaction; and determining that the first output is within an unspent transaction output set for the blockchain network. In such implementations, confirming may include confirming that an action identifier in the generation transaction indicates registration. In some such implementations, confirming may include validating a digital signature within the generation transaction based on the miner identifier.

In some implementations, the method may further include revoking the miner identifier. In some cases, revoking may include creating a revocation transaction having the first output of the validity-check transaction as an input; digitally signing the revocation transaction; and propagating the revocation transaction on the blockchain network.

In some implementations, the method may further include updating the miner identifier to register a new miner identifier. Updating may include creating a new validity-check transaction having a new first output controlled by the mining node and containing the new miner identifier; propagating the new validity-check transaction on the blockchain network; and mining, by the mining node, a new block containing a new generation transaction, wherein the new generation transaction includes another information field that contains the miner identifier, the new miner identifier, a new reference to the new validity-check transaction, and a first digital signature based on the miner identifier and a second digital signature based on the new miner identifier. In some cases, the updating may further include revoking the miner identifier by creating and propagating a transaction that includes the first output of the validity-check transaction as an input.

In another aspect, there may be provided a computing device implementing a node in a network. The computing device may include memory, one or more processors, and computer-executable instructions that, when executed, cause the processors to carry out one or more of the methods described herein.

In yet another aspect, there may be provided a computer-readable medium storing processor-executable instructions for operating a node in a network, the processor-executable instructions including instructions that, when executed by one or more processors, cause the processors to carry out at least one of the methods described herein.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application will refer to hashing or a hash function, which is intended to include any one of a number of cryptographic hash functions that, when applied to an arbitrary set of data or "message", deterministically produce a unique fixed-length alphanumeric string. The result of a hash function may be called a hash value, fingerprint, hash result, or equivalent. Examples include, but are not limited to, SHA-2, SHA-3, and BLAKE2.

In this document the term 'blockchain' is understood to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin, as exemplified by the Bitcoin SV protocol, may be referred to herein for the purpose of convenience and illustration, it should be noted that the invention is not limited to use with the Bitcoin blockchain and alternative blockchain implementations and protocols fall within the scope of the present invention.

A blockchain is a peer-to-peer, electronic ledger which is implemented using a computer-based decentralised, distributed system. The blockchain is made up of blocks which in turn are made up of transactions. Each transaction is a data structure that encodes, among other possible information, the transfer of control of a digital asset between participants in the blockchain system and includes at least one input and at least one output. Each block header contains a summary of the block's contents, such as in the form of a Merkle root, and each block header contains a hash of the previous block header so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

The blockchain is implemented over a network of nodes. Each node is a computing device with network connectivity and executing software that carries out the applicable blockchain protocol. Nodes validate transactions and propagate them to other nodes in the network. Specialized network nodes, termed "mining nodes" or "miners", collect a set of unconfirmed transactions, i.e. pending transactions, into a block and attempt to "mine" the block. Mining, in these examples, refers to solving a proof-of-work (POW) before any other miner in the network succeeds in solving a proof-of-work for their respective block. In the Bitcoin example, a POW involves hashing a block header containing a nonce until the result is below a threshold value set by a difficultly parameter. The nonce is repeated incremented and the hashing repeated until the result is below the threshold value or until the miner receives notice that another miner has succeeded. Variations in mining process will be familiar to those ordinarily skilled in the art.

Among the various things that are checked when validating a transaction, a node determines whether the inputs to a transaction are valid. In particular, the node evaluates whether the unlocking script evaluates as true and determines whether the input references an "unspent transaction output" (UTXO) from an earlier transaction. Some nodes may maintain a running list or set of UTXO to enable fast determination of whether a referenced transaction output is in the UTXO set or not. A transaction may be identified by its unique transaction identifier, TxID, which in some implementations is a hash of the transaction. Some transactions may have more than one output, so a unique transaction "outpoint" may be identified by the TxID and an index, where the index point to one of the outputs in the ordered set of outputs from the transaction. If the transaction output (e.g. outpoint) is present in the UTXO set, then the output of that transaction is "unspent" and available to serve as an input.

The unlocking script for a transaction outpoint defines how "control" over that output is to be proven in order to be exercised. In many cases, the address associated with a transaction output is a hash of a public key. To prove control over that output, an unlocking script often requires the public key and a digital signature generated using the corresponding private key. In this manner, the node that controls the private key is able to control when and how the transaction output is used in any subsequent input. As will be discussed further below, this has the corollary that when a transaction input corresponding to a particular public key includes a digital signature, then the entity associated with that particular public key is effectively signing or certifying the transaction contents.

Public-key cryptography has become ubiquitous in online communications. In many instances, a process and policy is needed to provide certainty that a public key is owned by an associated with a particular entity. The most common approach to ensuring that a public key is authentic and has not been compromised is a public key infrastructure (PKI). PKI relies upon a trusted third party to "authenticate" public keys as valid. These entities are "certificate authorities" (CAs). The CAs provide for registration and issuance of digital certificates that confirm the binding between a public key and a particular owner. The holder of a public key provides another entity with its public key and its digital certificate. The other entity may then verify the authenticity of the public key by confirming that a trusted CA has digitally signed the certificate.

As noted above, mining nodes are key to securing the blockchain network. Mining nodes are compensated for their work when they win the race to find a valid new block. The compensation comes through transaction fees from individual transactions and from a "coinbase" transaction that is included in the new block. A coinbase transaction has no inputs and it outputs a prescribed quantity of tokens (e.g. coins) to the miner, effectively creating new tokens. A coinbase transaction may also be referred to as a "generation transaction", and those terms may be used interchangeably herein. The coinbase or generation transaction has certain characteristics that distinguish it from regular transactions. For example, each valid block contains only one generation transaction. Each generation transaction has no input and generates an output of tokens of a quantity set by the then-prevailing block reward due to a successful miner according to the governing blockchain protocol. The generation transaction is a "proof-of-work transaction", as it can only be created by a mining node that successfully mines a block, i.e. completes a proof of work.

In many blockchain systems, a single entity may own, control or direct a large number of individual computers acting as mining nodes. In some cases, the resources of a plurality of mining nodes may be pooled together in a mining pool that leverages the computational power of a vast number of individual processors. In many of the examples below, reference may be made to a "miner", a "mining node", or to a public-private key pair held or controlled by a miner/mining node. It will be appreciated from context that those references may include an individual computer implementing a mining node and/or a collection or pool of computers/processors implementing a mining pool owned or controlled by a mining entity.

Given the importance of mining nodes, it would be advantageous to be able to verify the authenticity and identity of a mining node and/or a mining node's purported public key. It would be particularly advantageous to be able to do that verification without relying on trust in a third party certification authority.

Establishing Verifiable Miner Identity

In accordance with one aspect of the present application, a miner may establish a miner identity by mining a block that includes, within the coinbase transaction, a declaration of the miner identity. The validity of the newly-mined block and the validity of all transactions in it are confirmed by the blockchain network. The mining node's inclusion of its miner identity in the coinbase transaction is a declaration of identity that is backed by proof-of-work. The miner identity in the examples below is a public key. No third party CA is required to validate the association between the mining node and its declared public key, since the association is backed by the blockchain network and proof-of-work.

In order to facilitate possible revocation of the miner identity, for example if the corresponding private key is compromised, the miner may first create a validity-check transaction in which the miner identity is declared and for which there is an output controlled by the miner. The coinbase transaction may include a reference to this validity-check transaction. Part of the identity verification operation carried out by another node may be to confirm that the validity-check transaction has not been "revoked" through transfer of the output controlled by the miner. That is, the miner may invalidate its own miner identity by "spending" the output of the validity-check transaction, thereby removing it from the unspent transaction (UXTO) set. This provides for a fast revocation mechanism that does not rely on mining a new block to revoke the miner identity.

Reference will now be made to FIG. 1, which shows, in flowchart form, one example method 100 of establishing miner identity in a blockchain network. The method 100 includes a set-up operation 102 and a registration operation 104. The set-up operation 102 includes creating and propagating a validity-check transaction (VCT). The VCT includes an arbitrary input and two outputs. One output is a miner-controlled output allocating arbitrary tokens to a miner-controlled address. The second output of the VCT includes an information field containing the miner identity, which in this example is a miner-selected public key $PK_{ID}$. The miner holds the corresponding private key $sk_{ID}$. The information field may be an OP_RETURN field in a Bitcoin-based implementation. The miner identity (e.g. miner ID) in this example is the public key $PK_{ID}$.

The VCT is propagated on the blockchain network where it is eventually confirmed by inclusion in a mined block, such that the VCT is then on-chain.

The registration operation 104 involves the mining node successfully mining a new block. Mining a block involves assembling a candidate block containing a plurality of transactions selected from the mempool of unconfirmed transactions. The mining node also inserts a coinbase transaction into its candidate block. It then attempts to mine the block by repeatedly incrementing the nonce in the header and hashing the block header to try to find a hash value lower than the difficultly setting. If another mining node succeeds, then the miner verifies that the other mining node's new block is valid and then it creates a new candidate block and attempts again.

In operation 104, the mining node succeeds in mining a new block, and the new block contains a coinbase transaction that itself contains the miner identity, e.g. $PK_{ID}$, and that contains a reference to the VCT. The reference may be the transaction identifier for the VCT, $TxID_{VCT}$, for example.

Once the mining node has succeeded in mining a block containing a coinbase transaction declaring the miner identity, then it has succeeded in establishing its miner identity. The identity is verifiable, and can be revoked or updated by the mining node, if necessary, in a provable and traceable manner. Moreover, the identity and its association with the mining node is backed by proof-of-work and is secured by the network, allowing third parties to rely on the miner identity (e.g. its public key $PK_{ID}$) without requiring trust in a certificate authority. The miner identity may then be used for a number of purposes, including tracking miner activity, proving miner authenticity or status, establishing or engaging in secure encrypted communications with the miner, and ranking of miners for various purposes, among other things.

Figure 2:
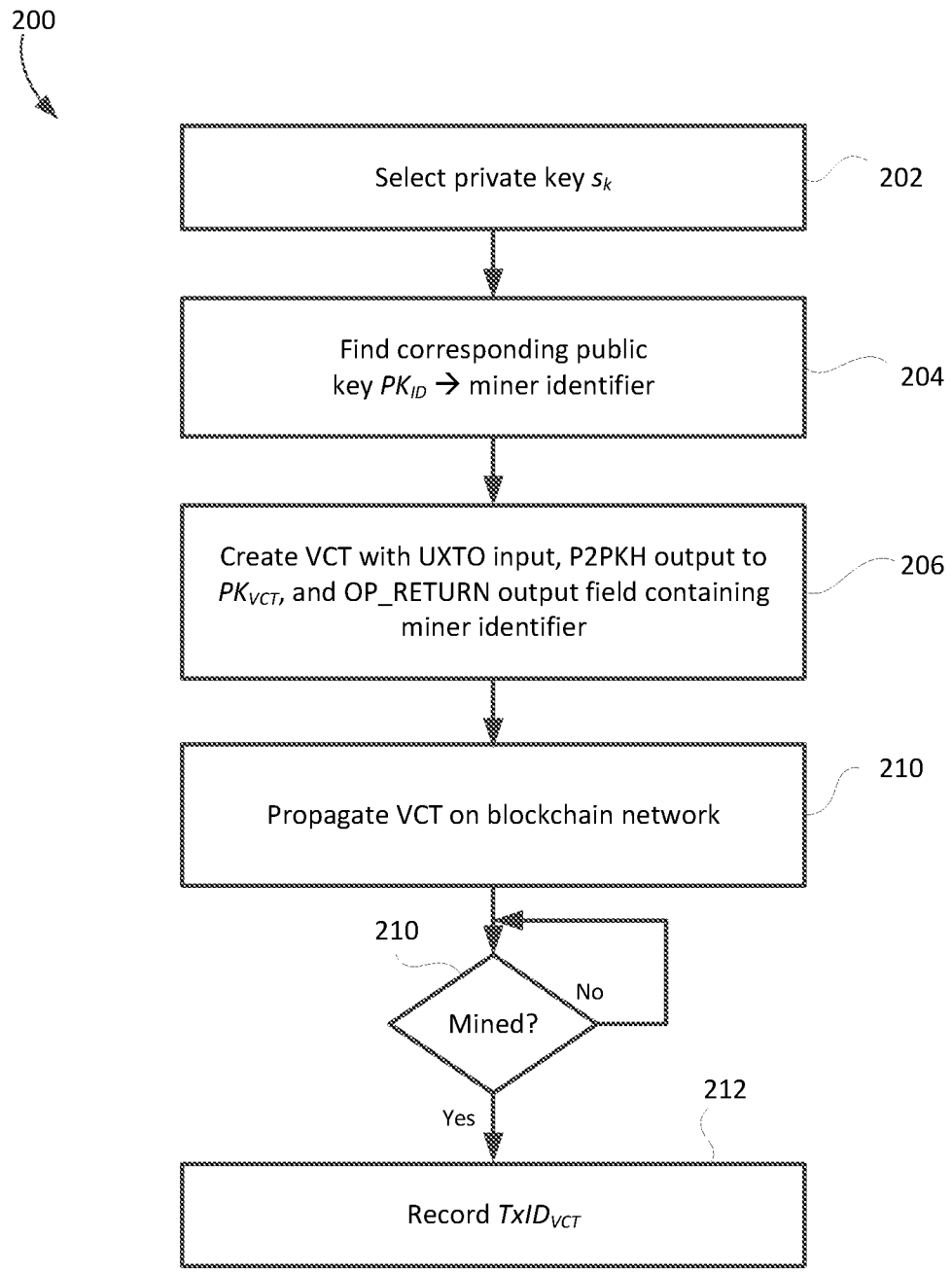
FIG. 2 shows, in flowchart form, an example method of setting up a fast-revocation option for registering a miner identity.

Reference will now also be made to FIG. 2, which shows one example set-up method 200 that may be used in the method 100 of establishing miner identity. The method is carried out by a mining node in this example.

In operations 202 and 204 the mining node selects a private key $sk_{ID}$ and finds the corresponding public key $PK_{ID}$. The public key $PK_{ID}$ is the miner identifier.

The mining node then creates, in operation 206, a validity-check transaction that has an arbitrary input and two outputs. The input may be any UTXO for which the mining node holds the corresponding private key. That is, any UTXO controlled by the miner. In many implementations, the input may be a coin or token quantity sufficient to offset any transaction cost associated with the VCT to ensure that the VCT is included in a block. In some implementations, a minimum token quantity may be established by policy.

One of the outputs is an output to any address controlled by the mining node. That is, the output is to an address for which the mining node holds the corresponding private key to enable it to unlock the associated locking script. In some examples, the output address may be labelled $PK_{VCT}$, which is any public key selected by the mining node and for which it holds the corresponding private key. The output may be, for example, a P2PKH (pay to public key hash) operation specifying transfer to a public key hash (e.g. a Bitcoin address) selected and controlled by the mining node.

The other output includes a non-operational information field into which information may be inserted. In particular, the field contains the miner identifier $PK_{ID}$. In a Bitcoin-based implementation, the output may use the OP_RETURN opcode to provide for an information field.

There may be blockchain protocols in which a non-operational information field may be included in a transaction for the purpose of publishing information within a transaction that is not necessarily implemented as an "output" of the transaction, as that term may be understood. Nevertheless, it will be appreciated that the term "output" in these examples referring to the information field is intended to include such possible implementations on alternative blockchain protocols.

Once the VCT has been created in operation 206, the mining node then propagates the VCT on the blockchain network in operation 208. Those ordinarily skilled in the art will appreciate that the propagation of the VCT may involve each node of the network verifying the transaction and then sending it to all other nodes to which it is connected, such that the transaction is quickly propagated through the full blockchain network. As an unconfirmed transaction, it will be inserted into mempools from which individual mining nodes will select transactions for inclusion in candidate blocks. Accordingly, it will eventually be "confirmed" by way of inclusion in a mined block. In operation 210 the mining node evaluates whether the VCT has been confirmed by being included in a mined block. Once it has, then in operation 212 the mining node records the transaction identifier, $TxID_{VCT}$. It will be appreciated that the mining node may, in some implementations, record the transaction identifier prior to the VCT being mined.

With the VCT part of the blockchain, its first output to $PK_{VCT}$ forms part of the UXTO set of "unspent" outputs until the mining node chooses to move/transfer the tokens associated with that output. This UXTO serves as the validity-check mechanism. As long as it remains part of the UXTO set, the miner identifier in the VCT remains valid and unrevoked. As soon as it is no longer in the UXTO set, the miner identifier in the VCT is no longer valid.

Figure 3:
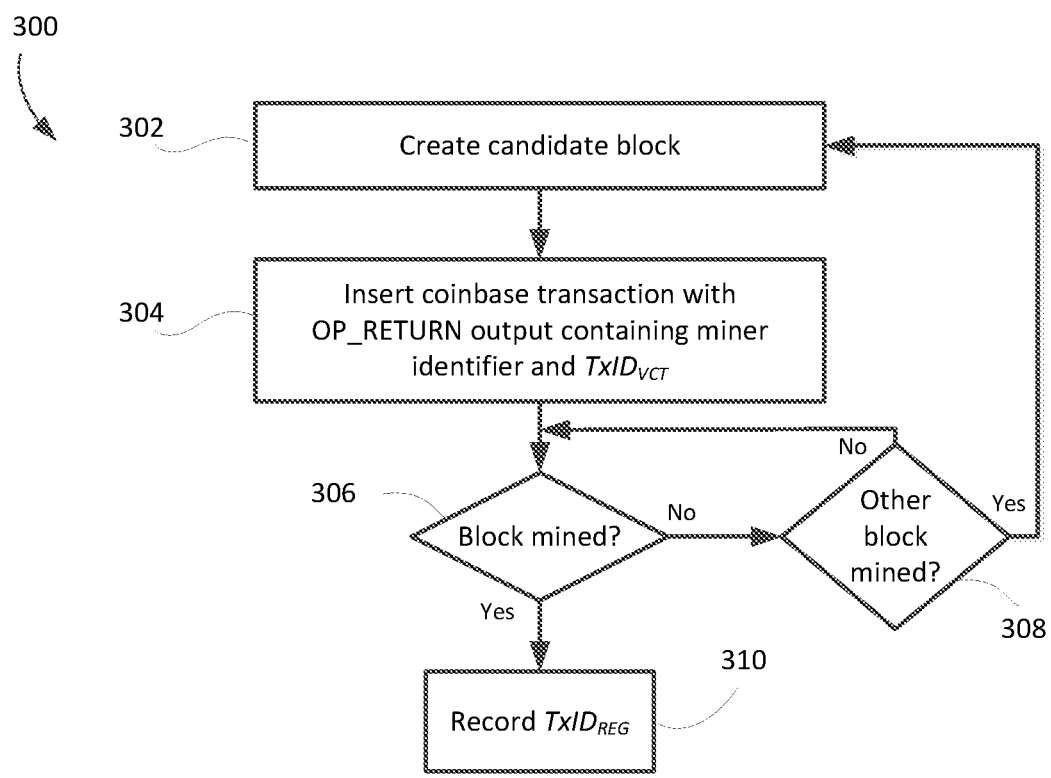
FIG. 3 shows, in flowchart form, one example method of recording miner identity on the blockchain.

Reference will now also be made to FIG. 3, which shows one example registration method 300 that may be used in the method 100 of establishing miner identity. The method is carried out by a mining node in this example. The method 300 assumes that a set-up operation creating the validity-check transaction associated with miner identifier $PK_{ID}$ has already occurred.

In operation 302, the mining node creates a candidate block. The candidate block contains a number of transactions selected from a mempool of unconfirmed transactions. The mining node then inserts a coinbase transaction in the candidate block, as reflected by operation 304. The coinbase transaction, in addition to minting the prescribed number of new tokens or coins for the mining node, includes an information field that contains the miner identifier $PK_{ID}$ and a reference to the VCT. The reference may be the transaction identifier, $TxID_{VCT}$. The information field may be provided using an OP_RETURN code or an equivalent, for example.

In addition to the miner identifier and reference to the VCT, the information field may contain additional information. For example, it may contain an action identifier or code indicating what action is being implemented by way of the coinbase transaction. In this example, the action may be "registration", to indicate that the mining node is publicly registering its miner identifier. It may also or alternatively include a signature. As an example, the signature may be a signature of the rest of the information field, e.g. Signature: Sig($sk_{ID}$, Action‖Miner ID‖VCT), where VCT is $TxID_{VCT}$ and Miner ID is $PK_{ID}$.

Once the candidate block with this coinbase transaction has been generated, the mining node attempts to mine the block, as indicated by operation 306. It also evaluates whether a competing miner has successfully mined another block, as indicated by operation 308. If a competing miner wins the race to mine a block, then the mining node validates the other block, adds it to the blockchain, and returns to operation 302 to build a new candidate block and try again.

If the mining node succeeds in mining the candidate block, then it records the transaction identifier $TxID_{REG}$ for the coinbase transaction. Note, that it may alternatively note the block number as it will contain only one coinbase transaction that other nodes may be able to identify based on the block number.

Having successfully mined a block with a registration coinbase transaction, the mining node has successfully registered its miner identity, and has published it on the blockchain. Another node that receives the miner identifier, e.g. public key $PK_{ID}$, may verify that the public key is valid, and is associated with the mining node, without relying on trust in a separate certificate authority.

Figure 4:
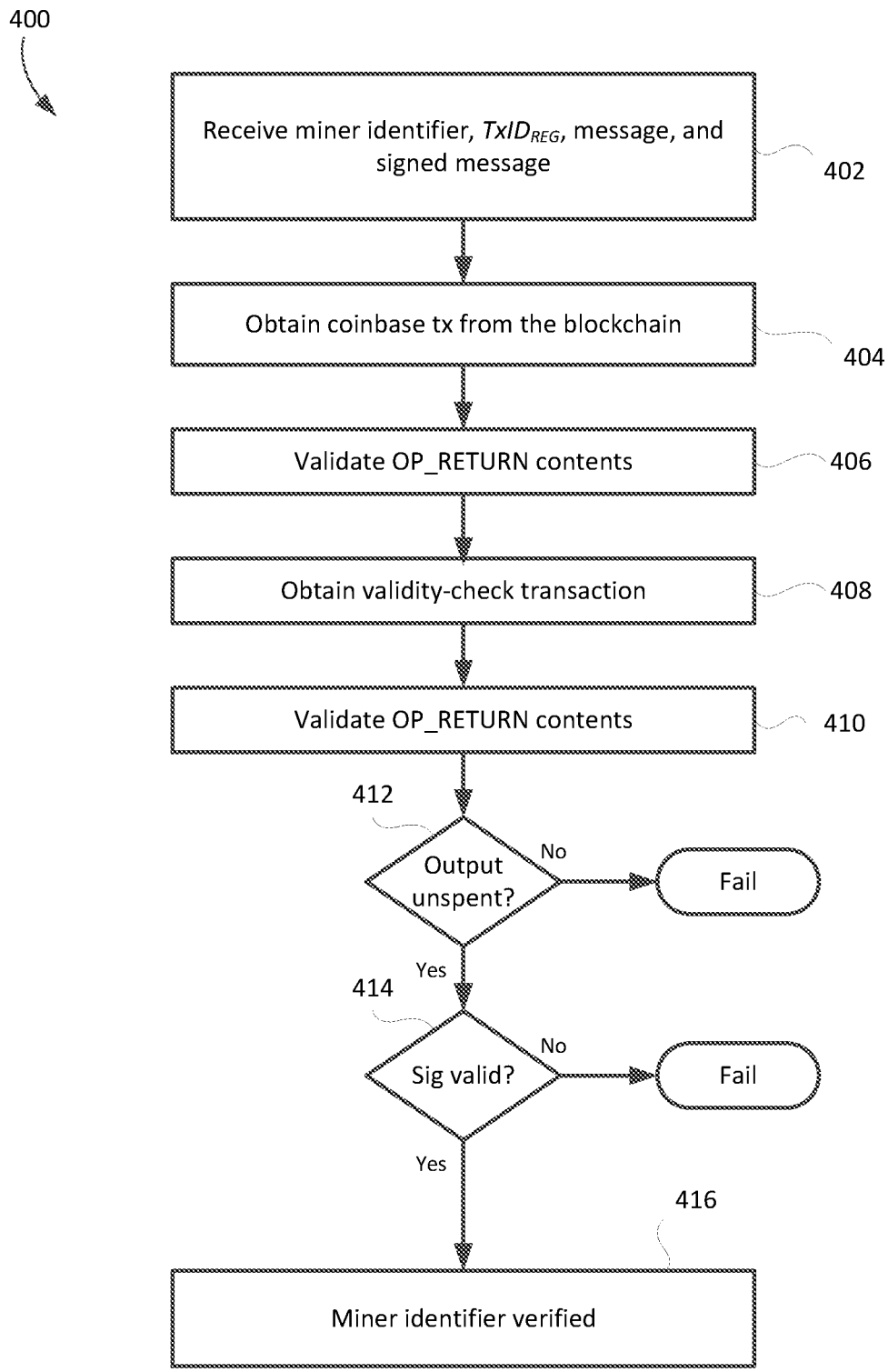
FIG. 4 shows, in flowchart form, an example method of verifying miner identity.

FIG. 4 shows, in flowchart form, one example method 400 that a node may carry out to verify a miner identifier in accordance with an aspect of the present application. The node is any node, within or outside the blockchain network, that is to validate the miner identifier $PK_{ID}$. The validation may occur, for example, as part of verifying or approving a request from the miner, establishing a communication session with the miner, or otherwise proving the validity of the public key $PK_{ID}$ and its association with the mining node.

In operation 402, the node receives or retrieves the miner ID ($PK_{ID}$) and the registration transaction identifier (TxI- $D_{REG}$ or, in some cases, the block number in which the registration coinbase transaction appears). Operation 402 may further include retrieving or receiving a message that the mining node purports to have signed. The message m and the signature $\sigma_m$ may be provided by the mining node. In some cases, the message and its signature may be part of a digital certificate provided by or published by the mining node as proof of its identity.

In operation 404, the node retrieves the registration coinbase transaction from the blockchain based on the registration transaction identifier $TxID_{REG}$. It then validates or confirms certain data in the registration coinbase transaction in operation 406. For example, the node may parse the OP_RETURN field to extract the information in that field from the coinbase transaction. From the parsed information, it obtains the VCT transaction identifier $TxID_{VCT}$. It may confirm that the OP_RETURN field includes the same public key $PK_{ID}$ provide by the mining node, and that the "action" is "registration".

From the VCT transaction identifier published in the registration coinbase transaction, the node may retrieve the VCT in operation 408. The node may confirm that the OP_RETURN field in the VCT has the same public key $PK_{ID}$, as indicated by operation 410. It may then evaluate whether the other output of the VCT remains "unspent", i.e. that it remains part of the UXTO set of available output points. This may involve querying a UXTO set database, directly or through an intermediary node. The query may be based on an outpoint identifier, which may include the transaction identifier, $TxID_{VCT}$, and an index indicating which output. If the output does not appear in the UXTO set, then the miner identifier is invalid as it has been revoked or replaced. Accordingly, the verification fails.

If, however, the outpoint is in the UXTO set, the node may then treat $PK_{ID}$ as a verified public key for the mining node, and it may then validate the mining node's signature using $PK_{ID}$ to confirm the mining nodes signature in operation 414. Note that operation 414 may include the node confirming the signature within the coinbase transaction OP_RETURN field, if any, or the node confirming the signature $\sigma_m$ on the message m, or both. Obviously, if the signature check fails, then the purported mining node cannot be validated as holder of the corresponding private key and the verification fails. If the signature check succeeds, then the mining node is verified as the mining node associated with the mining identifier, that is verified registered public key $PK_{ID}$.

As noted above, a registered miner ID can be revoked by removing the first output of the VCT from the UXTO set. This is done through "spending" that output, by using it as an input to any other transaction. This may include transferring any tokens allocated to that first output to a new address in a revocation transaction. The creation and propagation of a revocation transaction is sufficient to cause any verification of the miner ID to fail since the verifying node will be unable to locate the output in the UXTO set. Nevertheless, the miner may further register the revocation by including an OP_RETURN field in the coinbase transaction for its next mined block. In one example, the OP_RETURN may include the action "revocation" and the miner ID. In some implementations, it may further include the transaction identifiers for both the registration transaction and the revocation transaction and a signature.

In many cases, rather than simply revoking a miner ID due to its private key being compromised, a mining node may wish to "update" or replace its miner ID. This may be due to disclosure or theft of a private key, or may be done regularly as part of risk-management to ensure periodic update of key material.

In order to update an old miner ID, $PK_{ID\text{-}OLD}$, the mining node first creates a new VCT for the new public key $PK_{ID\text{-}NEW}$. From that process it obtains a new VCT transaction identifier $TxID_{VCT\text{-}NEW}$. The mining node then mines a new block with a new coinbase transaction to register the new miner ID; however, to link it to the old ID and any work history of the old ID, the miner may use the action "Update" or "Update ID" to signal that the coinbase transaction is not mere registration of a miner ID for the first time, but is to replace a previous miner ID. The contents of the OP_RETURN field in the update coinbase transaction may include:

1. Action: Update ID
2. Old MinerID: $PK_{ID\text{-}OLD}$
3. New MinerID: $PK_{ID\text{-}NEW}$
4. Old MinerID Signature: $Sig(SK_{ID\text{-}OLD}, PK_{ID\text{-}OLD}\|PK_{ID\text{-}NEW})$
5. Old VCT signature: $Sig(SK_{VCT}, PK_{ID\text{-}OLD}\|PK_{ID\text{-}NEW})$
6. New VCT: $TxID_{VCT\text{-}NEW}$
7. New Signature: $Sig(sk_{ID\text{-}NEW}, Action\|New MinerID\|New VCT)$ In this example, it will be appreciated that the update operation involves the mining node supplying up to three signatures: one relating to the old miner ID, one relating to the old VCT, and one relating to the new miner ID. In some cases, the old VCT signature may not be included.

It will also be appreciated, that the mining node may invalidate the earlier miner ID through use of the output from the old VCT as an input to some other transaction. In one example, the output may be an input to the new VCT. In another example, the mining node may wait until it has successfully mined a block to register the updated miner ID before propagating a separate revocation transaction to invalidate its old miner ID.

Using the above system, a miner is able to establish and register its provable identifier on the blockchain. By including it in the coinbase transaction of a mined block, the miner proves it is a bona fide mining node, and the validity of the identifier and associated material is backed by proof-of-work. The VCT provides a mechanism for fast revocation, if needed. In some example implementations, the VCT may, by policy, necessitate that at least a predetermined token or coin value be allocated to the output, thereby supplementing the proof-of-work with a proof-of-stake. Advantageously, the above system avoids the need for trust in a certificate authority and involves no additional work for the mining node and very little additional data in the block.

The above-described registration system and methods enable miners to prove identity and provides a mining node with a digital certificate that another node can verify without reliance upon a certificate authority. Moreover, as will be described below, the miner identifier may be used to provably chain together coinbase transactions from blocks mined by that miner. This provides the miner with a verifiable work history associated with their miner ID. This work history may be useful in establishing a number of things, including miner status, entitlement to access certain resources, ranking in a hierarchy of miners for some purpose, etc. In the following description, this work history may be referred to as a "proof of reputation" system.

Proof of Reputation

In one aspect, the present application provides methods and systems for recording a miner work history on the blockchain, and for verifying miner work history. As will be described, in examples below the work history is recorded by way of a chain of linked coinbase transactions in blocks mined by the mining node. The work history may be used, in some implementations, to determine a reputation score for the mining node. The reputation score may be use in a number of applications, including miner voting operations as an example.

In some of the implementations described below, the coinbase documents each include a miner identifier in an information field. The miner identifier may, in some implementations, be established and verifiable using the methods and systems described above. However, in some implementations other techniques or systems may be used to establish a miner identifier and for verification purposes. Accordingly, it will be understood that the work history and proof-of-reputation examples described below do not necessarily require use of the miner identifier registration process described above in all implementations.

As described above, one mechanism for registering a miner identifier is to put the miner identifier into a coinbase transaction of a block mined by the associated mining node. The miner identifier may appear in an information field, like an OP_RETURN field, in the coinbase transaction. The information field may further include a signature or other data. As noted above, in some implementations, the information field may include a reference to a validity-check transaction, which enables fast revocation of the miner identifier and easy verification by others that the miner identifier has not been revoked.

Figure 5:
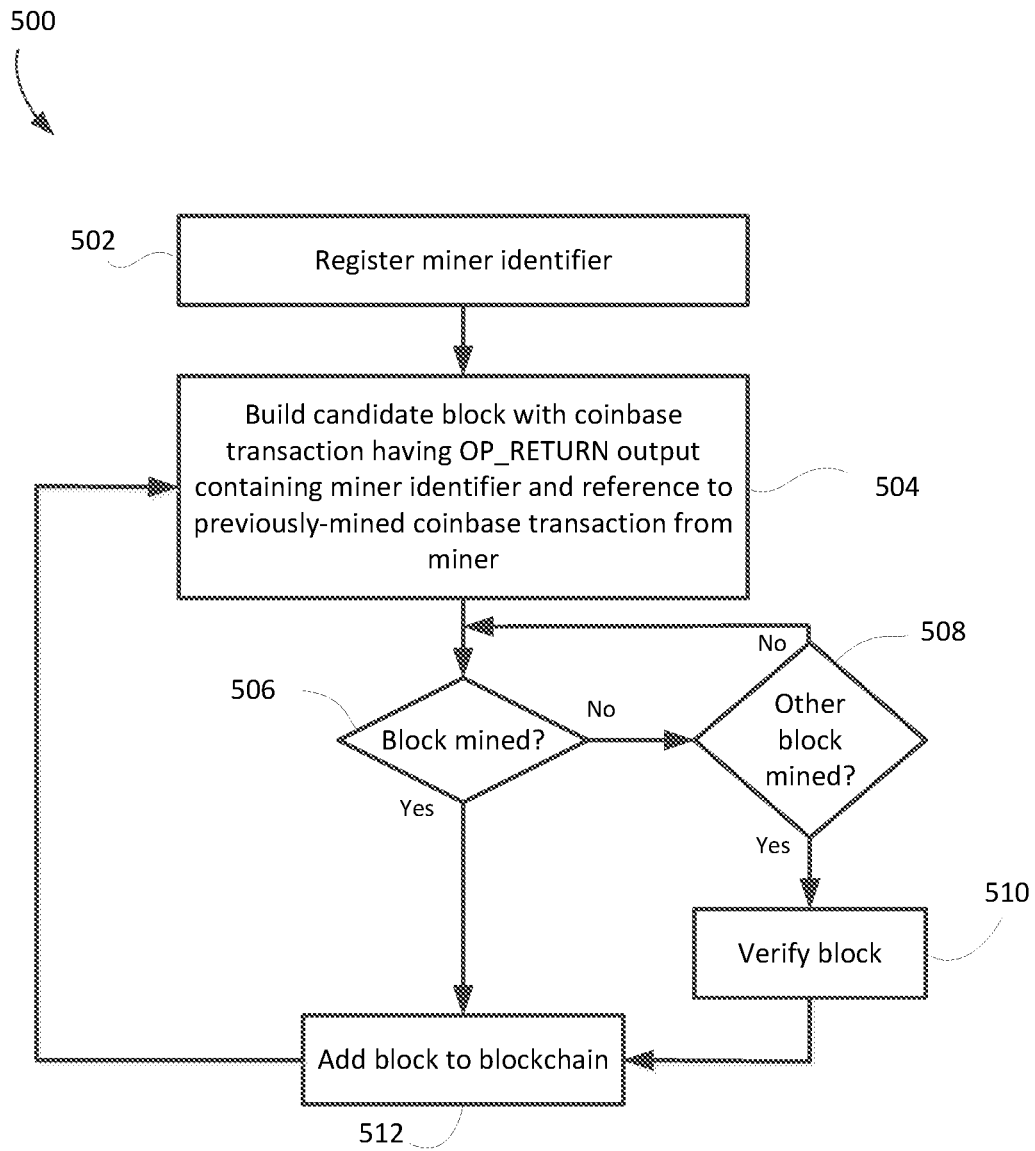
FIG. 5 illustrates one example method of recording a work history on a blockchain.

Coinbase transactions may further be exploited in conjunction with a registered miner identifier to record a work history for a mining node. FIG. 5 shows, in flowchart form, one example method 500 for recording miner work history on a blockchain. The method 500 is carried out by a mining node associated with the miner identifier. The miner identifier may be a public key for which the mining node holds the corresponding private key, i.e. the miner identifier may be $PK_{ID}$.

The method 500 includes registering the miner identifier in operation 502. As noted, the registration operation includes publishing the miner identifier in a registration coinbase transaction within a block mined by the mining node.

In operation 504, the mining node continues to try to mine new blocks. In particular, the mining node builds a new candidate block and inserts a coinbase transaction that includes an information field containing the miner identifier. The coinbase transaction information field further contains a reference to a previous coinbase transaction in a block mined by the same miner. That previous coinbase transaction is the most-recently mined block in which the coinbase transaction contains the miner identifier. In the case of the second block mined, the reference is to the registration coinbase transaction. Subsequently mined blocks from that mining node will contain coinbase transactions linked by the reference to the coinbase transaction of the most-recently mined block in the order in which they were mined. The reference may be, for example, a transaction identifier for the coinbase transaction, e.g. the TxID. In some cases, the reference may be to the block number containing that coinbase transaction, on the basis that a node could identify the coinbase transaction within that block. In some cases, the reference may be an "outpoint" that includes a TxID and an index pointing to one of the outputs of the coinbase transaction, in particular the OP_RETURN output.

In some implementations, the information field contains additional information. For example, the information field may contain a reference to the registration coinbase transaction in every subsequent block mined by the mining node in addition to the reference to the coinbase transaction from the most-recently mined block from the mining node. As another example, the information field may include a digital signature produced based on the miner identifier, i.e. using the private key associated with the miner identifier. The digital signature may be of the reference(s) included in the information field, for example.

Once the candidate block with the coinbase transaction has been created in operation 504, the mining node then attempts to mine that block in operation 506. It also monitors for receipt of notification of a new block from another mining node in operation 508. If another node succeeds in finding a new block, the mining node verifies that the new block is valid in accordance with the applicable blockchain protocol in operation 510 and then adds that new block to the blockchain. If the mining node is successful in mining the candidate block before receiving notice of a new block from another node, then it quickly propagates the successfully mining of the candidate block on the blockchain network and adds that new block to the blockchain in operation 512. Irrespective of whether the new block on the blockchain comes from the mining node or another node, once the new block is found the mining node returns to operation 504 to build a new candidate block and try again.

It will be appreciated that the above-described cycle, provided the mining node is occasionally successful in mining a new block, results in a chain of linked coinbase transactions linking blocks mined by the mining node from a most recent block back to the original registration coinbase transaction. As the OP_RETURN data is visible on the blockchain, the linked set of coinbase transactions, each containing the miner identifier, is readily identifiable as a published record of the mining node's work history.

Figure 6:
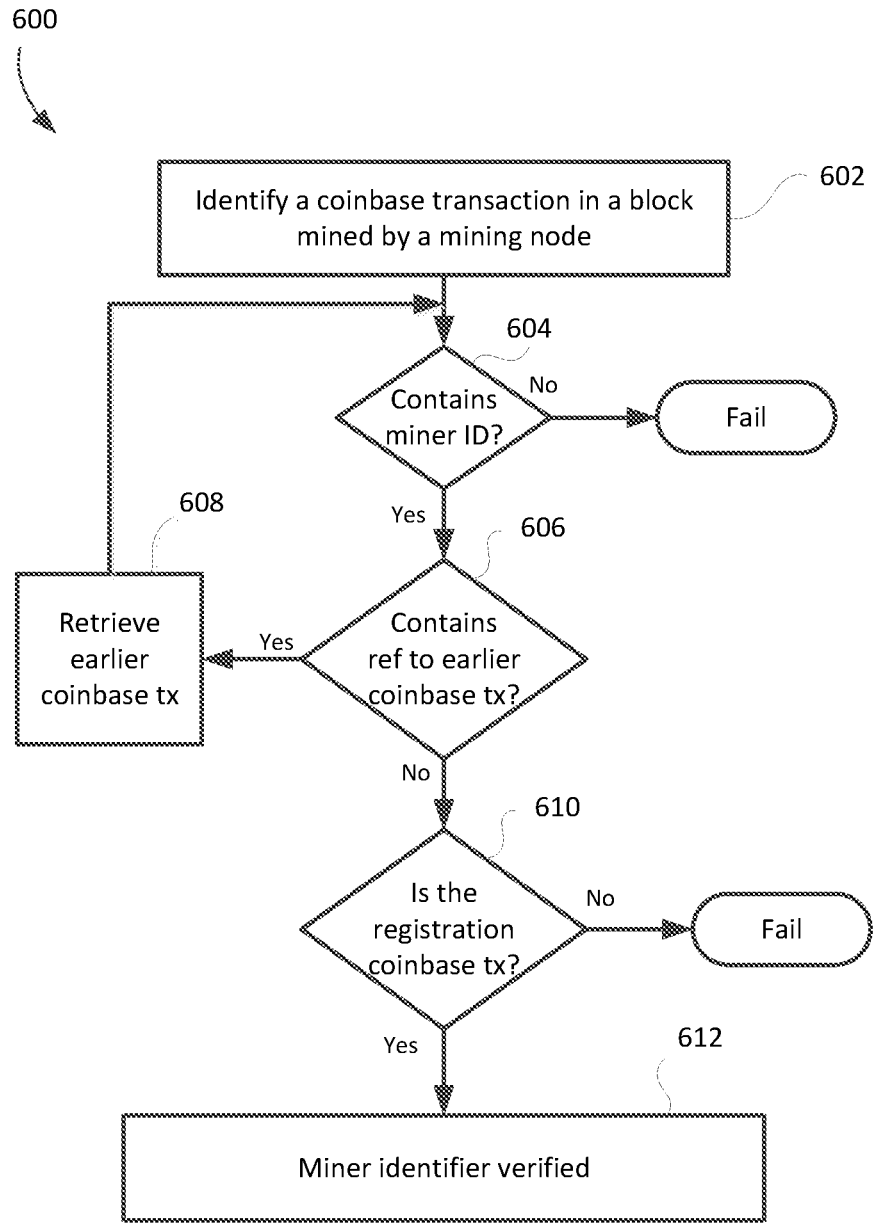
FIG. 6 shows an example method of verifying a work history using a blockchain.

Reference is now made to FIG. 6, which illustrates one example method 600 of verifying a miner work history from a blockchain. The method 600 may be carried out by any computing node, whether a part of the blockchain network of nodes or not.

The computing node identifies a coinbase transaction in operation 602. This identification may occur in a number of possible ways. For example, the mining node may provide the computing node with its purported identity and a transaction identifier for the coinbase transaction. The transaction identifier may point to the most recently mined coinbase transaction produced by the mining node. In some situations, the mining node may provide this information to the computing node in connection with a request to join, vote, participate, communicate or otherwise as part of asserting that the mining node has a particularly identity and associated reputation or work history. This assertion may be published by the mining node in some manner and the computing node may access and retrieve the information from the publication. Irrespective of the context or the mechanism, the computing node obtains information that identifies a particular coinbase transaction as a part of a purported work history for a particular mining node.

In operation 604, the computing node assesses whether the coinbase transaction contains, in an information field, a miner identifier. In many situations, the computing node will have obtained a purported identifier for the mining node and operation 604 may involve confirming that the same identifier appears in the coinbase transaction. If not, then the method 600 fails, as the coinbase transaction does not validate any work history for the purported miner identity.

The computing node further determines, in operation 606, whether the coinbase transaction information field contains a reference to an earlier coinbase transaction. The reference may be a TxID number for example. In some cases, the reference may be block number or height identifying the block in which the coinbase transaction is to be found, or may be an outpoint of the earlier coinbase transaction. If the reference is present, and is to an earlier (lower block height) mined coinbase transaction, then in operation 608 the computing node retrieves a copy of that coinbase transaction from the blockchain and returns to operation 604 to confirm that it also contains the miner identifier and points to an earlier coinbase transaction. In this manner, the computing device traces back through the linked set of coinbase transactions using the references in the coinbase transaction information fields that linked back to the previous one in the order they were mined.

If in operation 606, one of the coinbase transactions does not contain a reference to an earlier coinbase transaction, the computing node evaluates whether it is the registration coinbase transaction, i.e. the first in the chain. The may be verifiable from the information field, which may contain an indication that it is the registration coinbase transaction, e.g. it may contain "Action: Registration" or an equivalent code or indicator. In some cases, it may alternatively or additionally, be verified on the basis that all other coinbase transactions in the chain identify it as the registration coinbase transaction. If it is not the registration coinbase transaction, then the chain is broken and the method 600 fails to verify the work history. If it is, then the work history has been identified, and the computing node may go on to validate the miner identifier in operation 612. As noted above, in some embodiments this may include utilizing the validity-check transaction and the associated verification process.

The above described process, as one example, allows for a third party computing node to validate that a particular mining node has a certain work history. That is, the computing node may readily trace the work history of the mining node, which provides the mining node with verifiable reputation proof. A mining node with a long history of producing valid blocks may be considered more reliable, important, trustworthy, committed, or invested than a mining node with little or no work history. On this basis, the "proof of work" serves to not only determine which block is valid and which miner receives a current reward for its investment in computing power, but also serves to underpin the building of a miner reputation for investing in computing power and commitment to building a particular blockchain.

The mining process involves searching for a block header hash that is below a target difficulty threshold. The search involves incrementing a nonce value in the header, hashing the block header, evaluating whether the hash results in a number lower than the difficultly threshold and, if not, incrementing the nonce value and trying again. The difficulty threshold is set by the protocol and is periodically adjusted based on the blockchain protocol to result in a block approximately every 10 minutes. The adjustment occurs so that the blockchain network takes into account changes in overall hash power in the network. As hash power is added, the difficultly is changed to ensure blocks are not produced too quickly and easily. In the Bitcoin Core protocol, for example, the difficulty is adjusted every 2016 blocks (approximately 14 days). In the Bitcoin Cash or Bitcoin SV protocols the difficulty is adjusted every 144 blocks, for example.

The block header includes a field, the nBits field, that specifies the current difficultly threshold used for that block. The difficultly threshold is represented in base 256 scientific notation. So, if $A = a_1 a_2 a_3 a_4$ are the 4 bytes, then the target, T is defined as:

$$T = a_2 a_3 a_4 \times 256^{a_1 - 3}$$

The value of $a_1$ must be in the range $0 \le a_1 \le 34$ to ensure that the target always remains below $2^{256}$ and therefore can be represented as a 32-byte string. Given that the SHA256 function behaves like a random oracle (i.e. that SHA256 outputs are random 256-bit strings where each bit is equally likely to be 1 or 0 independent of other bits) the likelihood that the block header hash falls below the target for a trial nNonce value is:

$$P = \frac{T-1}{2^{256}}$$

In another aspect of the present application, a reputation score may be determined for a mining node based on its verified work history. As discussed above, the work history may be represented by a chain of linked coinbase documents that evidence the association between a mining node, its miner identifier, and a set of blocks mined by that mining node.

In one example implementation, a reputation score for the mining node is determined based on a count of blocks mined, i.e. a count of linked coinbase documents. This example provides equal weighting to any block at any point in the blockchain history provided it forms part of the chain of mined blocks via the linked coinbase transactions.

In another example implementation, the reputation score may be based on a weighted count of blocks mined. That is, each block may have a weight associated with it. In one example implementation, the weight may be based on block height. For instance, one implementation may give greater weight to older blocks. In another instance, an implementation may give greater weight to more recent blocks.

In another implementation, the weight assigned to a block may be based on the block difficultly. That is, blocks with a lower difficulty threshold, i.e. that, on average, require greater hash power to mine, may be given a greater weight in the determination of reputation score. In one example of such an implementation, a reputation score may be determined as a function of the target difficulties of each block containing one of the coinbase documents in the chain of linked coinbase documents.

As an example, if the miner reputation score is $Rep_{ID}$, the target difficulty of block i is $T_i$, and the number of blocks in the work history is B, then the miner reputation score may be calculated as:

$$Rep_{ID} = f(T_i) = \sum_{i}^{B} 2^{256}/T_i$$

In some examples, the reputation score may be based on the entire work history or may be based on a window of up to a maximum number of most recent blocks, i.e. a "rolling" reputation score. In some cases, the window may be based on the blockchain height, e.g. any block from the work history falling within X number of blocks of the current blockchain height.

In some example implementations, a current reputation score may be calculated by the mining node and included in each coinbase transaction information field.

In some cases, the reputation score may be normalized, such as dividing it by a maximum reputation score, e.g. the reputation score resulting from all blocks in the blockchain or window. This would ensure all reputation scores are between 0 and 1.

Figure 7:
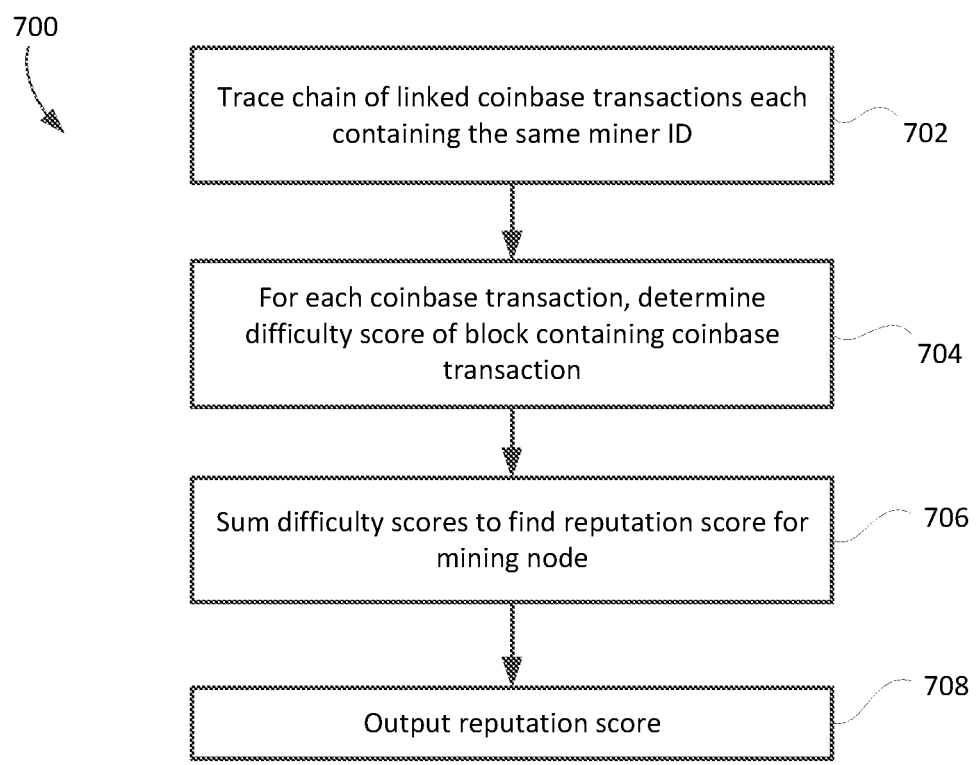
FIG. 7 shows an example method of determining a reputation score for a mining node based on a recorded work history.

Reference is now made to FIG. 7, which shows an example method 700 of determining a mining node's reputation score. The example method 700 may be performed by the mining node, by another blockchain node, or by a computing node external to the blockchain network.

In operation 702, the chain of linked coinbase transactions for a particular mining node is traced, for example as described above in connection with FIG. 6. From tracing the coinbase transactions, the work history of the mining node is identified. In operation 704, the difficulty threshold of each block containing one of the coinbase transactions is determined. The reputation score for the mining node is then determined in operation 706 by applying a function to the set of difficulty thresholds. As discussed above, this may include summing the difficulty thresholds (or their inverted values). Additional or alternative weighting may be applied by the function. The result is a reputation score for the mining node, which is output in operation 708.

The reputation score is a quantifiable measurement of the mining node's contribution to the blockchain that may be used in a number of scenarios. Advantageously, all data for determining and validating a miner identity and its associated reputation score is publicly available from the blockchain, and is validated by virtue of the immutable nature of the blockchain backed by proof-of-work. In order to prevent malicious behavior, the reputation score of a mining node may only be improved through mining blocks, i.e. through positive contribution to stability of the blockchain network.

The reputation score is developed by a mining node including its miner identifier and links to a previous block in a coinbase document. The contents of the coinbase document are in the control of the mining node, meaning a mining node need not rely on any third party validation or certification to build a reputation. Moreover, a mining node cannot fake or falsify a reputation.

The ability to verifiably determine a reputation score for a mining node having an associate miner identity may be used in a number of application. For example, entitlement to participate in particular protocols or activities may be predicated on the mining node having a minimum threshold reputation score, so as to only permit miner with a certain pedigree to be involved. Another potential application is to voting. Particularly when it comes to proposed changes to the underlying blockchain protocol, miners may be tasked with submitting a vote, and that vote may be weighted in some manner. One option is to weight votes based on reputation score, thereby giving greater weight to miner that have a higher reputation score on the basis that they have done more work to build the existing blockchain.

One example voting scheme that was used in a blockchain involves opening up a window of time during which miners may vote and then tallying the votes based on blocks mined during that window of time. This provides the most votes to whichever miner has the greatest hash power during the window of time, and does not take into account history of contribution. This can result in a "hash war", and makes the system vulnerable to "rented hash" in which a miner interested in skewing a vote result temporarily commits a large quantity of computing power to the blockchain in order to dominate the hash power of the blockchain during the window, but does not have the resources or interest in committing that quantity of computing power to the blockchain over the longer term. In some cases, the "rented hash" is unsustainable in that it is an uneconomic allocation of resources, but is a cost incurred by that miner to force an outcome on the vote. The miner thus obtains an influence on the vote that is out of proportion to that miner's actual involvement in and investment the blockchain.

In one example, a miner voting process may allow for mining nodes to participate provided they have a registered miner identifier, e.g. $PK_{ID}$, and an associated reputation score $Rep_{ID}$. The vote occurs over an agreed upon window of time, from a start time to an end time (or, from a start block height to an end block height). The mechanisms for achieving consensus on the window and timing for any vote may be on-chain or off-chain.

To cast a vote, a mining node must mine a block during the voting window. In the block, the miner inserts within a coinbase transaction its miner identifier and a reference to its most-recent coinbase transaction. It may further include its calculated reputation score in some implementations. The mining node also includes a vote signal. Depending the vote, the signal may be a binary "yes"/"no" or "for"/"against" signal, or may be a multi-valued signal such as selection as between three or more options, a ranking of three or more options, etc. In some examples, the coinbase transaction may further include a digital signature based on a private key corresponding to the miner identifier. The digital signature may be over the other contents of the information field in the coinbase transaction.

In some implementations, a single miner may be entitled to vote multiple times during a voting window. In some other implementations, only one vote is permitted per miner, i.e. per associated miner identifier $PK_{ID}$. In the latter case, if a miner mines more than one block that purports to cast a vote, then a policy may be applied to determine which to count. For example, the policy may be to take the earliest (lowest block height) vote. Alternatively, the policy may be to take the last (highest block height) vote, to allow for miners to change their votes during the window.

Any vote monitor may verify that a vote is valid by verifying the miner identifier, as discussed above, and verifying the reputation score associated with that miner identifier, as discussed above. If a signature is required as part of the voting coinbase transaction, it guards against the possibility of another miner maliciously mining a block and purporting to cast another miner's vote by using their $PK_{ID}$. After the voting window closes, any observer may determine the outcome by summing the reputation score weighted votes cast for each option, as all information is recorded on the blockchain and can be verified.

By calculating voting using historic block data, rather than current and future block data, voting can be conducted over a relatively short period of time whilst ensuring that the voting weights are calculated using enough proof-of-work data to accurately reflect chainwork. This enables relatively short voting periods without the risk of voting weights being distorted by temporary hash bursts.

However, since voting requires each $PK_{ID}$ to mine a new block, enough time must be given to enable miners with to cast votes. Assuming a block time of 10 minutes If a miner with $PK_{ID}$ has x % of the network hash rate, then the likelihood of mining at least one block in t hours is:

$$P(\text{"Mine at least one block in } t \text{ hours"}) = 1 - \left(1 - \frac{x}{100}\right)^{6 \times t}$$

Table 1, below, gives P for various x and t

| x | t = 24 | t = 48 | t = 72 | t = 96 |
|---|---|---|---|---|
| 0.5% | 0.514 | 0.764 | 0.885 | 0.944 |
| 1% | 0.765 | 0.945 | 0.987 | 0.997 |
| 5% | 0.999 | 0.999 | ≈1 | ≈1 |
| 25% | 0.999 | ≈1 | ≈1 | ≈1 |

From the above table it will be appreciated that even if a $PK_{ID}$ has only 1% of network hash rate a voting period of 72 hours almost guarantees that they are able to mine a voting block.

In at least one example modeling of possible hash war scenarios, the above-described reputation system can be shown to reduce the effectiveness of rented hash such that even if an attacker were to dominate 75% of the network over 14 days, the attacker would only manage to accumulate 23% of voting power.

It will be appreciated that it may be that some or all of the above-described operations of the various above-described example methods may be performed in orders other than those illustrated and/or may be performed concurrently without varying the overall operation of those methods.

Figure 8:
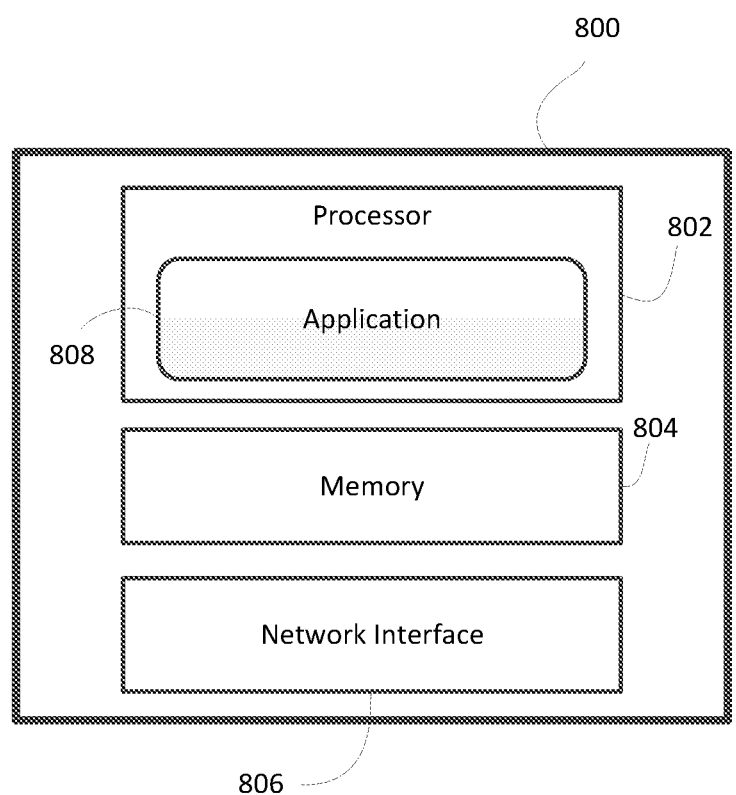
FIG. 8 shows, in block diagram form, a simplified example of a computing node, such as a mining node.

Reference is now made to FIG. 8, which shows, in block diagram form, a simplified computing device 800, in accordance with an example of the present application. The computing device 800 may carry out one or more of the above-described functions. The computing device 800 may be a mining node, for example. In some implementations, the computing device 800 may be a non-mining node that operates to validate blockchain recorded data, such as a miner identifier, a miner work history, a miner reputation score, or a miner voting block, as examples.

The computing device 800 includes a processor 802, which may include one or more microprocessors, application specific integrated circuits (ASICs), microcontrollers, or similar computer processing devices. The computing device 800 may further include memory 804, which may include persistent and non-persistent memory, to store values, variables, and in some instances processor-executable program instructions, and a network interface 806.

The computing device 800 may include a processor-executable application 808 containing processor-executable instructions that, when executed, cause the processor 802 to carry out one or more of the functions or operations described herein.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method of registering identity of a mining node on a blockchain in a blockchain network, comprising:
    creating a validity-check transaction having a first output controlled by the mining node and containing a miner identifier;
    propagating the validity-check transaction on the blockchain network; and
    mining, by the mining node, a new block containing a generation transaction, wherein the generation transaction includes an output containing an information field that contains both the miner identifier and a reference to the validity-check transaction, and wherein the generation transaction is a coinbase transaction allocating a block reward to the mining node for mining the new block, the coinbase transaction having no input that references an unspent transaction output.

2. The method of claim 1, wherein the miner identifier comprises a first public key for which the mining node holds a corresponding private key.

3. The method of claim 2, wherein the validity-check transaction includes a second output providing an information field, and wherein the first public key is in the information field.

4. The method of claim 3, wherein the second output uses an OP_RETURN code.

5. The method of claim 1, wherein the generation transaction includes an OP_RETURN output providing the information field.

6. The method of claim 1, wherein the reference to the validity-check transaction includes a transaction identifier.

7. The method of claim 1, wherein the information field further includes one or more of an action identifier or a digital signature, wherein the digital signature is generated using a private key corresponding to the miner identifier.

8. The method of claim 1, further comprising verifying, by a second node, a validity of the miner identifier by:
    receiving the miner identifier;
    retrieving a copy of the generation transaction from the blockchain;
    retrieving a copy of the validity-check transaction from the blockchain based on the reference contained in the generation transaction;
    confirming that the received miner identifier matches the miner identifier in the generation transaction and the miner identifier in the validity-check transaction; and
    determining that the first output is within an unspent transaction output set for the blockchain network.

9. The method of claim 8, wherein confirming further includes confirming that an action identifier in the generation transaction indicates registration.

10. The method of claim 8, wherein confirming further includes validating a digital signature within the generation transaction based on the miner identifier.

11. The method of claim 1, further comprising revoking the miner identifier by:
    creating a revocation transaction having the first output of the validity-check transaction as a transaction input;
    digitally signing the revocation transaction; and propagating the revocation transaction on the blockchain network.

12. The method of claim 1, further comprising updating the miner identifier to register a new miner identifier by:
creating a new validity-check transaction having a new first output controlled by the mining node and containing the new miner identifier;
propagating the new validity-check transaction on the blockchain network; and
mining, by the mining node, a new block containing a new generation transaction, wherein the new generation transaction includes another information field that contains the miner identifier, the new miner identifier, a new reference to the new validity-check transaction, and a first digital signature based on the miner identifier and a second digital signature based on the new miner identifier.

13. The method of claim 12, further comprising revoking the miner identifier by creating and propagating a transaction that includes the first output of the validity-check transaction as a transaction input.

14. A computing device configured to manage a public key infrastructure using a blockchain network to register identity of a mining node on a blockchain in the blockchain network, the computing device including:
one or more processors;
memory; and
computer-executable instructions stored in the memory that, when executed by the one or more processors, cause the one or more processors to carry out a method of:
creating a validity-check transaction having a first output controlled by the mining node and containing a miner identifier;
propagating the validity-check transaction on the blockchain network; and
mining, by the mining node, a new block containing a generation transaction, wherein the generation transaction includes an output containing an information field that contains both the miner identifier and a reference to the validity-check transaction, and wherein the generation transaction is a coinbase transaction allocating a block reward to the mining node for mining the new block, the coinbase transaction having no input that references an unspent transaction output.

15. The computing device of claim 14, wherein the computer-executable instructions, when executed by the one or more processors, cause the one or more processors to perform the step of verifying a validity of the miner identifier by:
receiving the miner identifier;
retrieving a copy of the generation transaction from the blockchain;
retrieving a copy of the validity-check transaction from the blockchain based on the reference contained in the generation transaction;
confirming that the received miner identifier matches the miner identifier in the generation transaction and the miner identifier in the validity-check transaction; and
determining that the first output is within an unspent transaction output set for the blockchain network.

16. The computing device of claim 14, wherein the computer- executable instructions, when executed by the one or more processors, cause the one or more processors to perform the step of updating the miner identifier to register a new miner identifier by:
creating a new validity-check transaction having a new first output controlled by the mining node and containing the new miner identifier;
propagating the new validity-check transaction on the blockchain network; and
mining, by the mining node, a new block containing a new generation transaction, wherein the new generation transaction includes another information field that contains the miner identifier, the new miner identifier, a new reference to the new validity-check transaction, and a first digital signature based on the miner identifier and a second digital signature based on the new miner identifier.

17. The computing device of claim 16, wherein the computer- executable instructions, when executed by the one or more processors, cause the one or more processors to perform the step revoking the miner identifier by creating and propagating a transaction that includes the first output of the validity-check transaction as a transaction input.

18. A non-transitory computer-readable medium storing processor-executable instructions for managing a public key infrastructure using a blockchain network to register identity of a mining node on a blockchain in the blockchain network, the processor-executable instructions including instructions that, when executed by one or more processors, cause the one or more processors to perform a method of:
creating a validity-check transaction having a first output controlled by the mining node and containing a miner identifier;
propagating the validity-check transaction on the blockchain network; and
mining, by the mining node, a new block containing a generation transaction, wherein the generation transaction includes an output containing an information field that contains both the miner identifier and a reference to the validity-check transaction, and wherein the generation transaction is a coinbase transaction allocating a block reward to the mining node for mining the new block, the coinbase transaction having no input.

19. The non-transitory computer-readable medium of claim 18, wherein the processor-executable instructions, when executed by the one or more processors, cause the one or more processors to perform the step of verifying a validity of the miner identifier by:
receiving the miner identifier;
retrieving a copy of the generation transaction from the blockchain;
retrieving a copy of the validity-check transaction from the blockchain based on the reference contained in the generation transaction;
confirming that the received miner identifier matches the miner identifier in the generation transaction and the miner identifier in the validity-check transaction; and
determining that the first output is within an unspent transaction output set for the blockchain network.

20. The non-transitory computer-readable medium of claim 18, wherein the processor-executable instructions, when executed by the one or more processors, cause the one or more processors to perform the step of updating the miner identifier to register a new miner identifier by:
creating a new validity-check transaction having a new first output controlled by the mining node and containing the new miner identifier;
propagating the new validity-check transaction on the blockchain network; and
mining, by the mining node, a new block containing a new generation transaction, wherein the new generation transaction includes another information field that contains the miner identifier, the new miner identifier, a new reference to the new validity-check transaction, and a first digital signature based on the miner identifier and a second digital signature based on the new miner identifier.

\* \* \* \* \*